Patented Feb. 6, 1923.

1,444,288

UNITED STATES PATENT OFFICE.

HEINRICH H. WARMUND, OF BERLIN-CHARLOTTENBURG, GERMANY.

SEALING FLUID FOR PNEUMATIC TIRES AND THE LIKE.

No Drawing.   Application filed September 3, 1921.   Serial No. 498,492.

*To all whom it may concern:*

Be it known that I, HEINRICH H. WARMUND, residing at Berlin-Charlottenburg, Germany, have invented certain new and useful Improvements in Sealing Fluids for Pneumatic Tires and the like, of which the following is a specification.

The present invention has for its object to provide an improved sealing fluid which does not corrode rubber tubes in any way and yet secures a good seal.

In order to make clear my invention, I will illustrate it more particularly with reference to the following examples.

The improved sealing fluid according to the first example consists of suitable proportions of sugar, rice and fluid binding agents such as a gummy fluid or rubber solution and waste sulphite-cellulose liquor.

According to the second example the improved fluid consists of certain proportions of sugar, rice and fluid binding agents such as for instance a gummy fluid or rubber solution, together with waste sulphite-cellulose liquor and earthy constituents such as for instance powdered talcum.

According to the third example the improved fluid consists of certain proportions of sugar, pine-essence and fluid binding agents such as for instance rubber, and various earthy constituents such as for instance magnesia.

The addition of powdered talcum (French chalk) prevents the tires from running hot.

In manufacturing the improved sealing fluid, the essential substances, namely sugar, ground rice and a binding agent, are firstly stirred up together and boiled in each example, whereafter the substances mentioned above in the second and third examples, are added.

The resulting product which is not harmful to rubber tubes is drawn off into casks and well closed, and then put on the market.

The improved sealing fluid is used in the following manner:—The fluid which dries quickly in the air, is pumped in a suitable quantity into the pneumatic tires where it will remain in a liquid state for a very long time, if the air tube is tightly closed. In running, the fluid will come into contact with every spot of the interior of the air tube.

If the air tube becomes leaky, for instance when punctured by a nail, the fluid which is under pressure, will be forced into the leaky spot where it hardens very quickly, thereby restoring automatically the hermetical sealing at that spot. If afterwards the nail is extracted, the resulting hole will be caulked automatically in the same way as described before.

Damaged gas tubing can also be made airtight in a similar manner, by pouring the sealing fluid into the tubing. After the fluid has been caused to flow some few times through the whole tubing, the remaining fluid which does not adhere to the tubing, is returned into the cask which is then tightly closed, thus being fit for further use.

The coating formed by the new sealing composition in pneumatic tires, may reach a thickness of up to three millimetres, and will render even porous tubes air-tight.

What I claim is:—

1. A sealing fluid for pneumatic tires, gas tubings and the like, comprising a mixture of sugar, rice, a binding agent and waste sulphite-cellulose liquor.

2. A sealing fluid for pneumatic tires, gas tubings and the like, comprising a mixture of sugar, rice, a rubber solution and waste sulphite-cellulose liquor.

3. A sealing fluid for pneumatic tires, gas tubings and the like, comprising a mixture of sugar, rice, a binding agent, waste sulphite-cellulose liquor and an earthy constituent.

4. A sealing fluid for pneumatic tires, gas tubings and the like, comprising a mixture of sugar, rice, a gummy fluid, waste sulphite-cellulose liquor and an earthy constituent.

5. A sealing fluid for pneumatic tires, gas tubings and the like, comprising a mixture of sugar, rice, a binding agent, waste sulphite-cellulose liquor and talcum.

In testimony whereof I affix my signature.

HEINRICH H. WARMUND.